Nov. 13, 1956   J. GAUCI   2,770,262
MACHINE FOR FORMING SPRING-WIRE INTO ZIG-ZAG MATERIAL AND
METHODS OF FORMING ZIG-ZAG SPRING MATERIAL
Filed June 17, 1952   3 Sheets-Sheet 2
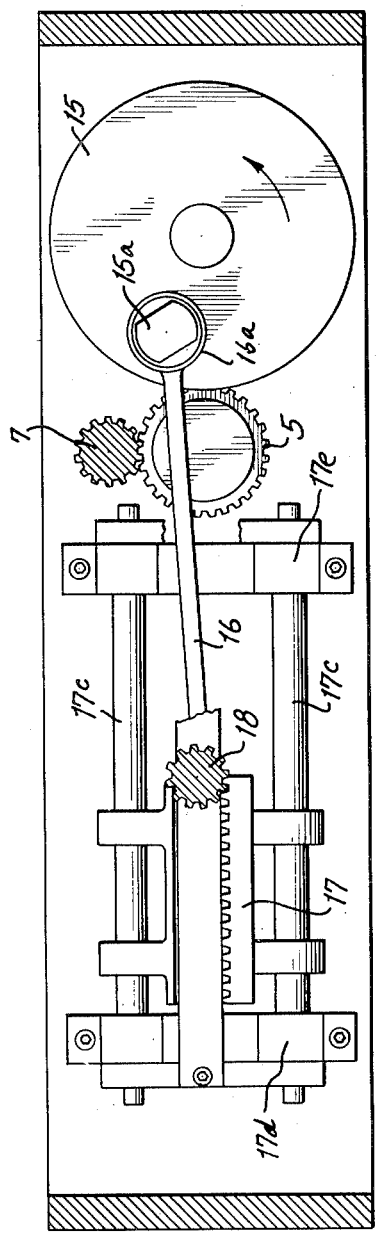
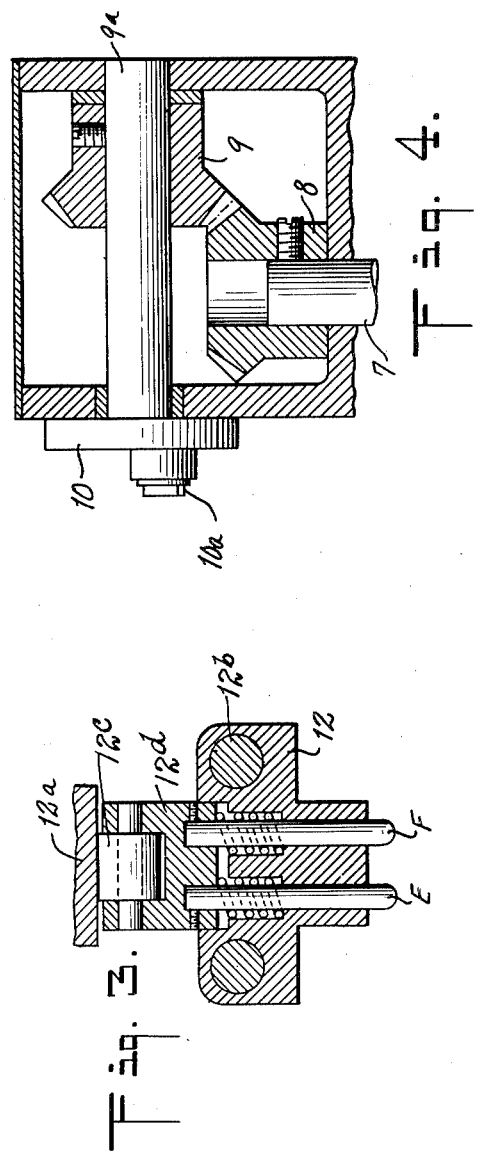
INVENTOR.
JOSEPH GAUCI
BY
ATTORNEY Nov. 13, 1956  J. GAUCI  2,770,262
MACHINE FOR FORMING SPRING-WIRE INTO ZIG-ZAG MATERIAL AND
METHODS OF FORMING ZIG-ZAG SPRING MATERIAL
Filed June 17, 1952  3 Sheets-Sheet 3
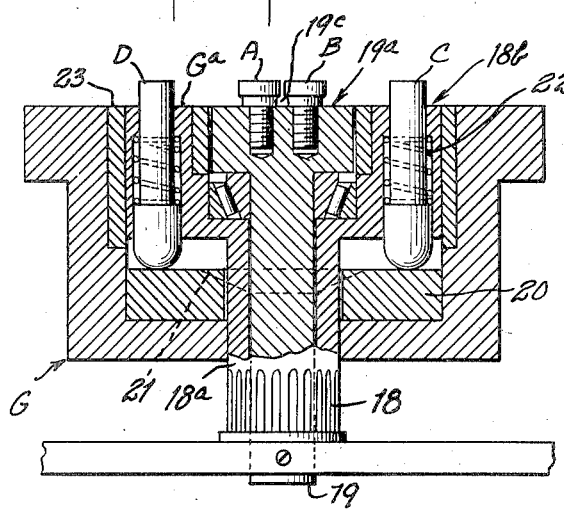
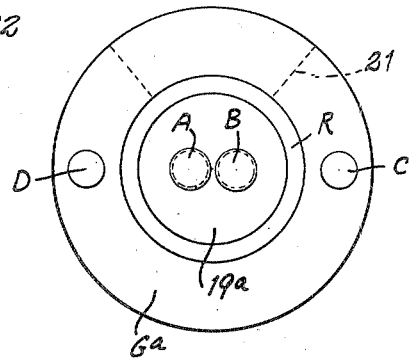
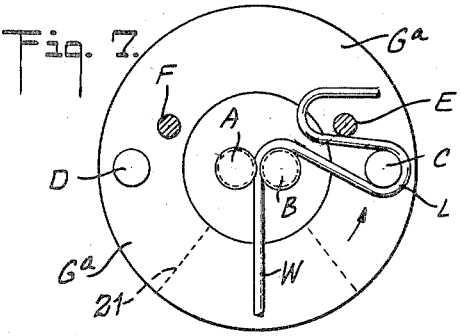
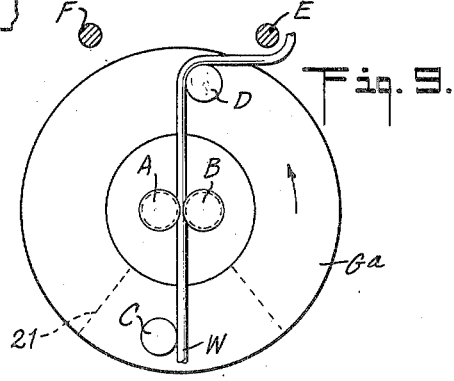
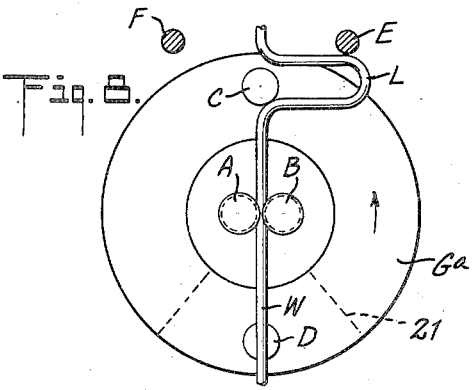
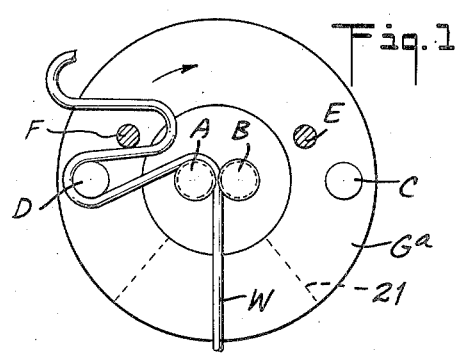
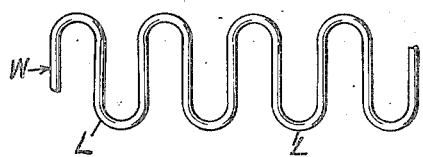
INVENTOR.
JOSEPH GAUCI
ATTORNEY

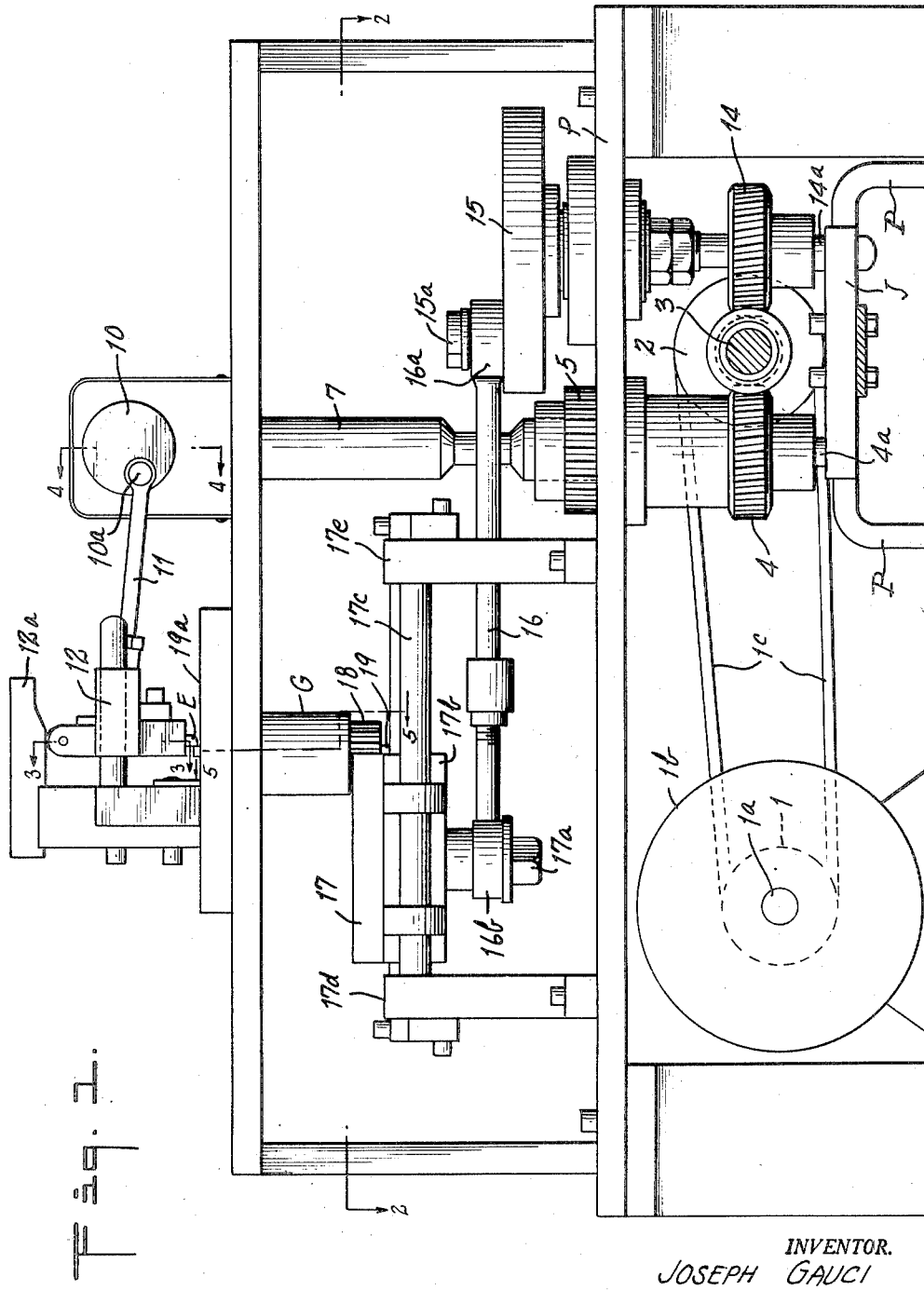

United States Patent Office 2,770,262
Patented Nov. 13, 1956

2,770,262

MACHINE FOR FORMING SPRING-WIRE INTO ZIG-ZAG MATERIAL AND METHODS OF FORMING ZIG-ZAG SPRING MATERIAL

Joseph Gauci, Jersey City, N. J., assignor to Springs, Inc., a corporation of New Jersey Application June 17, 1952, Serial No. 294,001

6 Claims. (Cl. 140—71)

This invention relates to a machine for forming spring-wire stock into zig-zag spring material and methods of forming zig-zag spring material.

By the use of my invention, I produce from straight spring-wire stock a flat, elongated zig-zag or sinuously-bent material adapted upon severance into suitable lengths to provide springs or spring units which, with slight modifications, are capable of use as springs for seat and back structures, cushions and other parts of chairs and the like, and which also are adapted for various other uses.

One of the objects of this invention is to produce a machine for and method of forming straight spring-wire stock into flat-zig-zag or sinuously-bent spring material with efficient resilient or elastic characteristics.

Another object of my invention is to provide a machine in which movable wire-forming elements are arranged for efficient and free arcuate movement about a fixed central element to sinuously form straight spring-wire stock into elongated spring material of general flat form and having a series of laterally extending, relatively straight body portions continuously connected at their opposite side edges with laterally-extending and reversely-curved edge portions having the curved portions or bends arranged successively in substantially the same plane.

Another object of my invention is to produce by the aforesaid arcuate movement elongated spring material adapted to be cut into units of generally flat spring form having the reversely curved and laterally extending edge portions uniformly, evenly and accurately formed and proportioned to retain all the natural spring or elastic characteristics of the wire, and to produce the best possible resilience or spring effect from the stock.

Another object of my invention is to utilize a method of forming zig-zag material that may be applied to machines of varying sizes and may be used for forming corrugations or crimps of varying sizes and to make zig-zag spring units from spring stock of varying diameters, weight and resilience.

Another object of my invention is to provide a method and machine for forming spring wire stock into zig-zag material by which wire stock is passed between and contacts at a predetermined point with the peripheries of a pair of circular and stationarily-positioned guiding mandrels, is then subjected simultaneously to initial bending of one corrugation about one member of said stationarily-positioned mandrels and to a final bending or forming operation of a successive corrugation by one member of a pair of arcuately-movable mandrels moving in one direction, then repeating said simultaneous bending operations about the other stationary mandrel by causing another movable mandrel to engage said stock at the initial curved bend and to swing the same about said other stationary member to procure a successive initial bend and successive completed arc or corrugation.

Another object of my invention is to provide a machine in which stationarily-positioned guiding mandrels are utilized as a pair of forming mandrels or elements about which movable members initially form a partial corrugation, in combination with primary-bending mandrels movable in an arc of a circle about said stationarily-positioned mandrels, said primary-bending elements preferably comprising a pair of forming pins mounted on a turret plate swivelled on a mounting shaft for said initial fixed bending mandrels and movable in a circular path about the contact point between said pair of initially bending and guiding elements, whereby the initial partial corrugations in a spring wire which are initially-bent about said initial bending mandrels will be successively engaged by said primary-bending formers within the initial bends produced by said initial formers for the purpose of modifying such initial bends and re-shaping the same into wide bent or curved sinuous corrugations or bends in the stock, thus producing a zig-zag spring material in which the resilience, elasticity or spring characteristics of the wire will be greatly increased.

Another object of this invention is, in a machine of the character specified, to simplify the construction and to reduce the number of parts to a minimum, and to this end to utilize as initial wire-forming mandrels a pair of stationary wire-guiding wheels mounted on a stationary shaft in combination with primary-bending mandrels mounted on a turret element swivelled on said stationary shaft and having forming pins moving concentrically about the contact point of said wire with said guiding wheels.

Another object of this invention is to provide a machine construction in which the stock wire in being formed is preferably bent freely to a line beyond that at which it assumes a permanent set, thus permitting such bent wire to return freely to its proper permanent set position.

Another object of this invention is to provide a method and machine in which one revolution of a turret member about a pair of stationary mandrels simultaneously produces a primary bend for one corrugation or zig-zag curve and an initial bend for a succeeding corrugation of curve which is subsequently engaged and formed by a primary forming element.

Another object of this invention is to provide a machine of the character described by which wire stock in one operation of a turret is bent to a position which extends beyond a plane passing diametrically through the two axes of rotation of said stationary mandrels and the point of contact thereof with the stock to produce in the stock wire a non-injurious permanent set.

Another object of my invention is to provide longitudinally-reciprocating means synchronized with and operable immediately after the forming operation of the primary bend by forming mechanism for one corrugation for engaging, during a rearward movement thereof, a leg portion between a previously formed corrugation and a corrugation being formed by the primary member at a position adjacent to the curved portion of the released corrugation so as to move and hold such released corrugation in position to assist in cooperation with the primary forming element in the permanent setting of the corrugation being formed by the primary forming element. For this purpose and to assist in aligning the formed material, I preferably utilize a mechanism comprising a pair of reciprocably-movable push-pins which move in synchronism with the movement of the turret and are positioned above said turret plate and adapted to be lowered from a raised position thereof to successively engage a portion of corrugation during formation thereof by the primary forming element, and to assist in the final operation and also to move the same forwardly or longitudinally of the machine.

Another object of my invention is in a turret construction of the type specified to provide, preferably at the bottom thereof below the path of movement of the turret plate, a cam plate provided with a normal portion and a drop section and adapted to raise and lower the primary forming pins in the turret plate to engage and release the wire.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in elevation of a machine for forming straight spring wire-stock into a sinuous or corrugated-spring material;

Fig. 2 is a longitudinal section on the line 2—2 of Fig. 1, looking in the direction of the arrows;

Fig. 3 is a vertical section on the line 3—3 of Fig. 1, looking in the direction of the arrows;

Fig. 4 is a vertical section on the line 4—4 of Fig. 1, looking in the direction of the arrows;

Fig. 5 is a vertical section on the line 5—5 of Fig. 1 showing my turret construction of forming mechanism;

Fig. 6 is a view in plan of the turret shown in section in Fig. 5;

Figs. 7, 8, 9 and 10 are diagrammatic views showing the varying positions of the spring wire and forming elements during the operation of forming the corrugations or crimps in such wire;

Fig. 11 is a view of flat spring unit cut from material made by my method and machine.

Referring now to these drawings, which illustrate a preferred embodiment of my invention, my machine is designed particularly to form from spring stock a spring material adapted to be cut into suitable unit lengths and to be subsequently modified by arching the unit in any suitable or well known manner to produce spring units, each of which is arched longitudinally about a suitable radius and embodies a series comprising a given number of sinuous corrugations, crimps or turns. Such arched spring units are useful in chair backs, etc. and when so arched have the characteristic of retaining their resiliency and returning to the original arched shape when they are, for example, temporarily bent in use into an arch of different radius by the weight of a person sitting on a chair seat in the cover of which these units are embodied. However, it will be understood that corrugated or crimped units of the type specified are applicable to many other uses and features of my invention will be applicable to the formation of spring material or spring units having structural characteristics other than the arched shape hereinabove referred to.

In the preferred form of my invention shown herein, I have illustrated only the elements for forming the spring stock into a spring material having successively-arranged and laterally-disposed arcuate formation, such as crimps or corrugations but it will be understood that prior to feeding the spring wire or stock into this machine, such wire may be passed through conditioning elements which are old and well known in the art, and that the spring material produced by this machine will for some uses, such as the use of units thereof in chair seats and the like, be subsequently cut into given lengths by a suitable cutting machine and arched longitudinally by a suitable arching device or machine. Such cutting and arching machines are both well known in the art and form no part of my present invention.

In said preferred embodiment of my invention shown herein, a straight spring-wire stock is passed through a guiding channel between a pair of stationarily-positioned guide wheels A and B, which are used as initial wire-forming mandrels, and a portion near the end of said wire stock is then bent around one of these initial wire-forming mandrels B while the end portion is passed around one of the primary arc-forming mandrels C mounted on a plate $G^a$ of a turret member assembly G, more particularly shown in Fig. 7, and also in the opposite direction around one member of a pair of reciprocating aligning and loop-pressing members. Said arc-forming mandrel and said cooperating reciprocating members E thus engage loops and corrugation portions in the wire stock. Upon starting of the machine, the stock will be fed forwardly by a primary forming element C and by the reciprocating aligning member E in order to move the material from the position shown in Fig. 7 into the position shown in Fig. 8. During such forward movement, the forming member C will travel in the arc of a circle and will pass out of the sinuous bend or corrugation, while the reciprocating member will continue to engage the opposite side of the outer leg of a loop or corrugation, whereupon the opposite or left-hand primary forming element D will be moved around to engage, as shown in Fig. 9, the initial bend or curved portion made by the initial forming element B, and will thereupon bend the wire stock in the opposite direction about the left-hand initial-forming mandrel A and will simultaneously move the engaged initially-curved portion into a position at the opposite side of a vertical plane passing through the axis of said initial forming element A and B and the point of contact thereof as shown in Figs. 9 and 10. The primary forming element D in cooperation with the reciprocating element F will provide a primary bend and a permanent set in the wire to complete an arcuate bend, whereupon the movement of the turret plate $G^a$ will be reversed to assist in the forward movement of the completely-curved part while the reciprocating guide pin F will remain in engagement with the leg of the crimp or corrugation. The crimp thus formed on the left-hand side of the turret plate is thus moved forwardly by the primary forming mandrel D and the reciprocating pin F. When this curved portion of the stock reaches its forward limit of movement, the left-hand primary bending mandrel D will, by the revolution of the turret plate, be moved out from between the legs of the crimp. Thus, upon further turning of the turret plate in the direction opposite to the forming operation just completed, the primary bending mandrel D will leave the open end of the crimp or corrugation and the mandrel member C at the opposite side of the stock will then engage the initial bend made in said wire-stock and will thereupon swing the same to the right into the position shown in Fig. 7, thus simultaneously bending the stock about the opposite initial-bending mandrel B and moving the same to the right thereof for the purpose of producing a succeeding primary arc, crimp or corrugation in the wire in which the inward reciprocation of the member E will cooperate. These steps of the method will be successive and continuous so that the stock will be formed into a flat unit such as shown in Fig. 11.

Referring now to the drawings of my machine which illustrate a preferred embodiment thereof, 1 indicates a sheave mounted on a shaft $1^a$ of an electric motor $1^b$. The rotation of the sheave 1 drives belt $1^c$ which in turn drives a sheave 2 mounted on and driving a shaft $2^a$ on which is also mounted a worm gear 3, which at one side thereof meshes and drives the worm 4 mounted on vertical shaft $4^a$, and at the opposite side thereof meshes with worm wheels 14 mounted on the drive shaft $14^a$. Each of these vertical shafts 4 and $14^a$ is suitably mounted, as shown, in a common journal plate J suitably supported by leg or side plates P. The shafts 4—$14^a$ extend vertically in substantially parallel relationship to each other and one of them is employed for transmitting movement to my movable wire-forming mandrels, while the other is used to transmit movement to my guiding and feeding pins as hereinafter more particularly specified.

As illustrated in Fig. 1, shaft 14ª extends through a base plate P and drives a rotatable horizontally-disposed wheel 15 having eccentrically mounted thereon a pin 15ª on which is mounted the bearing member 16ª of a connecting rod 16, which upon turning of the wheel 15 will cause the reciprocation of the rod 16. Said rod 16 has at its opposite end a bearing member 16ᵇ connected with a depending pin 17ª of a reciprocating carriage 17ᵇ carrying a rack 17. As shown, the carriage 17ᵇ is mounted for reciprocation on a horizontal rod or rods 17ᶜ supported in bearing members 17ᵈ—17ᵉ. Obviously, the rotary movement of the wheel 15 will, by the connection hereinabove described, be converted into a reciprocating movement for the carriage 17ᵇ. The rack 17 carried by said reciprocating carriage 17ᵇ meshes with a spur gear 18ª which, as shown, is formed integral with a shaft 19 extending vertically through the assembly G in fixed position and providing a face plate Gª above said assembly. On the exposed top 19ª of the shaft 19 is mounted the pair of stationary initial forming elements or mandrels A and B respectively. These mandrels A and B are arranged, as aforesaid, in stationary positions at the center of the turret assembly G.

The revolving turret member 18ª is, as shown, provided with the top face surface Gª in the same plane as the top face 19ª and is mounted to oscillate in opposite directions about the shaft 19 and mandrels A and B. This revolving turret is swivelled on the shaft 19 and constructed and is operated substantially as follows:

The turret assembly comprises the axially-positioned stationary shaft member 19 (see Fig. 5) which is provided on its top surface 19ᵇ with stationarily-positioned wire-forming mandrels A and B abutting at their peripheries and having a wire-guiding channel 19ᶜ between the same through which a stock wire W is threaded and then passes around one of the said mandrels, and as shown passes in a short initial turn around mandrel B. Movable mandrels C and D are mounted upon the revolving turret element 18 which by the rack 17 and spur gear 18ª are moved first in the direction of the arrow shown in Fig. 7. The stock wire is curved to extend partially around the stationarily-positioned mandrel B and also around a movable mandrel C which is mounted on the face 19ª of the turret member 18. The movement of the mandrel C in an arc of a circle and the feed of the stock wire will cause a loop L to be formed as shown in Fig. 7, and movement of the turret plate and mandrel C, together with inward and outward reciprocating movements of the member E, will move the wire stock W with the corrugation L into the position shown in Fig. 8. The mandrel C in this position leaves the loop L and moves around with the face Gª of the turret member 18 in the direction of the arrows in Figs. 8 and 9. During this movement, the mandrel D which was positioned as shown in Fig. 7 at the side of the turret opposite to the normal position of the mandrel C will be depressed by the drop section 21 of the cam plate 20 so that it passes under the stock wire being fed (see Fig. 8). Said mandrel D then moves in the arc of the circle indicated by the arrow in Figs. 8 and 9 into the position in contact with the initially-formed curved portion as shown in Fig. 9. The guide pin E will now be lifted to permit further arcuate movement of the wire in the direction of the arrow in Fig. 9. The continuation of the movement of the turret member 18 and surface Gª into the position shown in Fig. 8 will cause the formation in the stock wire W of a second corrugation or loop. The stock wire will then be moved forwardly in the same manner as illustrated in Figs. 8 and 9 and will provide a partial loop on the left hand side of the path of feeding movement. The turret 18 and face Gª will then be turned in the opposite direction as indicated by the arrow in Fig. 10 and the mandrel D will leave the loop while the mandrel C will be moved to engage the initially bent portion of the wire stock in the same manner as shown in Figs. 8 and 9, but at the opposite side of the said path. This return cycle of the operation will then continue to form a loop such as shown in Fig. 7, and it will be understood that the cycles of movement will continue in the manner to form alternate loops at opposite sides of the mandrels A and B.

Fig. 6 shows a plan view of the faces or upper surfaces of the movable members in the turret assembly G and illustrates a ring R set into a groove R'. The turret member 18ª is swivelled on the shaft 19 as shown in section in Fig. 5 together with the cup-shaped supporting structure G thereof, and it will be noted that at the bottom portions of the supporting structure the cam plate 20 is supported. The bottom portions of the movable primary mandrel members C and D are rounded and ride upon this cam and when they reach the cam depression 21 they are lowered by the action of the spring 22 to permit passage thereof beneath the wire as shown in Figs. 8 and 9. The use of rings R and 23 are mere constructional details.

It will be understood that one revolution of eccentric pin wheel 15 will move the rack 17 a sufficient distance to produce approximately a 360° turn in a clockwise direction of turret 18 and a counter-clockwise rotation thereof to the same degree. Therefore one revolution of said eccentric pin wheel 15 will produce approximately a complete revolution of the turret in clockwise and counter-clockwise directions in an alternate manner.

Simultaneously with these alternate movements of the turret member 18, the work wheel 4 will turn shaft 4ª and through gears 5 will turn shaft 7 on which gear 8 is mounted. Said gear 8 meshes with and turns gear 9 mounted on shaft 9ª which rotates wheel 10 which is provided with eccentric pin 10ª, which is connected to one end and drives connecting-arm 11, the opposite end of which is connected with a carriage 12 movable along rods 12ᵇ and produces a reciprocating action of carrier 12. Said carrier 12 carries vertically-movable push-pins E and F. These push-pins are mounted in a carrier head 12ᵈ provided with a roller-contacting cam 12ᶜ against which the carrier head 12ᵈ is pressed by springs 12ᵉ and causes up and down movement of the pins E and F.

The ratio of the strokes of push rod 16 to push rod 11 is one to two respectively, and therefore push-pins E and F are moved in synchronization with forming pins C and D.

When either of the forming members C or D in their movements hereinabove specified approaches the wire stock on the rear or non-forming side of mandrels A and D, said members C and D drop below the elevation of the wire by following the contour of a drop portion 20ª of cam plate 20 which is positioned at the base of the members C and D for this purpose.

The push-pins E and F thus rise and fall during the reciprocating action of their carrier head 12ᵈ which reciprocation causes said roller 12ᶜ on the head 12ᵈ at the upper end portion of such push-pins to contact with the cam member 12ª. Such push-pins thus will not foul the wire, but will strike and push at the proper time and position in order to cooperate with the forming elements in giving the desired configuration and width of the legs L of the sinuously bent portions of the wire.

Having described my invention, I claim:

1. In a machine for forming spring wire into zig-zag spring material, a support, a pair of centrally-disposed circular and grooved initial-bending wire-forming mandrels mounted on fixed axes on said support and having their peripheries arranged to provide a wire-feeding channel disposed therebetween to guide a section of wire, the wire being in contact with the peripheral surfaces of said initial wire forming mandrels, in combination with loop-forming means including a turret member movable in the arc of a circle about said centrally-disposed mandrels, and a pair of round wire-forming elements mounted on and carried by said turret to move about said centrally-positioned mandrels, and means for feeding a spring wire through said wire-feeding channel.

2. A machine for forming spring wire into zig-zag spring material as claimed in claim 1 in which the loop-forming means also embodies a pair of reciprocating pin members which are movable above said turret member and cooperate with said movable loop-forming element in moving the wire material beyond a position in which a permanent set is produced therein.

3. A method of forming spring-wire stock into units of corrugated spring material consisting in projecting forwardly along a given feed line a blank section of wire having a length sufficient to produce the corrugated unit to be formed, initially contacting opposite portions of the surface of said blank-wire section with a pair of stationarily positioned wire-forming mandrels having arcuate surfaces, contacting said wire blank section by an arcuately-movable forming element at a portion spaced from said initial contact portion and moving the same in one direction in a partial arc about said initially-contacted portion to form an initial partial bend of one corrugation about such stationarily positioned forming element and simultaneously forming a spaced and reversely-bent loop of a succeeding corrugation, then moving the blank wire section forwardly in relation to said stationarily positioned forming mandrels, engaging by another movable forming element said partial bend and moving the wire blank in the opposite direction and in contact with the other member of said initially contacting stationarily positioned forming mandrels and by said movable forming element completing the initial partial bend and simultaneously forming another reversely-bent loop of a succeeding corrugation.

4. In a machine for forming spring-wire into zig-zag spring material, a support, a pair of centrally-disposed adjacently-positioned round initial-bending wire-forming mandrels and means for mounting the same on fixed axes in a centrally-disposed position on said support, said wire-forming mandrels having peripheral portions disposed in adjacency to each other to form a wire-guiding channel therebetween, in combination with loop-forming means including a pair of oscillating wire-forming elements mounted diametrically outside the initial wire-forming mandrels, means for oscillating said oscillating forming elements to cause movement in one direction of one member of the said pair of wire-forming elements in an arc of a circle about a central point between the two stationarily-positioned mandrels and successively to cause the other member of said pair to be similarly movable in the opposite direction about said central point and having the wire in contact with the other member of said adjacently-positioned initial wire-forming mandrels, said movable elements being alternately engageable with sections of wire spaced from said mandrels, whereby said wire stock is moved and formed about the surface of stationarily-positioned wire-bending mandrel to produce partial bends in said wire material and said movable elements during such alternate oscillating movements are adapted to simultaneously engage said spring-wire stock at previously-formed partial bends and to form such partial bends into complete loops in a zig-zag material.

5. A machine for forming spring-wire into zig-zag spring material as claimed in claim 4 in which the pair of initial-bending wire-forming mandrels are mounted on the upper end of a fixed shaft, and the pair of movable wire-forming elements are mounted on a turret member having a swivelling movement about said shaft.

6. A machine for forming spring-wire into zig-zag spring material as claimed in claim 4 in which said movable forming elements are movable by a turret plate in a complete circle around said centrally-disposed initial-forming mandrels.

References Cited in the file of this patent

UNITED STATES PATENTS

| | | |
|---|---|---|
| 468,301 | Cooper | Feb. 2, 1892 |
| 1,439,411 | Griner | Dec. 19, 1922 |
| 2,331,294 | Bank et al. | Oct. 12, 1943 |
| 2,454,290 | Payne | Nov. 23, 1948 |
| 2,474,276 | Payne | June 28, 1949 |
| 2,582,576 | Zweyer | Jan. 15, 1952 |
| 2,655,193 | Payne | Oct. 13, 1953 |